United States Patent [19]
Huerta et al.

[11] 3,929,745
[45] *Dec. 30, 1975

[54] VANADIUM ORGANOPHOSPHATES

[75] Inventors: James R. Huerta; Amos R. Anderson; Jeffrey G. Meyer, all of Adrian, Mich.

[73] Assignee: Dart Industries Inc., Los Angeles, Calif.

[ * ] Notice: The portion of the term of this patent subsequent to July 27, 1988, has been disclaimed.

[22] Filed: Nov. 20, 1972

[21] Appl. No.: 308,066

Related U.S. Application Data

[60] Continuation-in-part of Ser. No. 102,949, Dec. 30, 1970, abandoned, which is a division of Ser. No. 836,169, June 24, 1969, Pat. No. 3,595,890.

[52] U.S. Cl...... 260/80.78; 252/429 B; 260/88.2 R; 260/88.2 E; 260/94.9 C; 260/94.9 CB
[51] Int. Cl.² .................. C08F 4/68; C08F 210/18; C08F 210/16
[58] Field of Search... 260/94.9 C, 94.9 CB, 88.2 E, 260/88.2 R, 80.78; 252/429 B

[56] References Cited
UNITED STATES PATENTS

| | | | |
|---|---|---|---|
| 3,063,973 | 11/1962 | Gladding et al. | 260/80.78 |
| 3,427,257 | 2/1969 | Bayer et al. | 260/94.9 C |
| 3,444,147 | 5/1969 | Turba et al. | 260/80.78 |
| 3,476,732 | 11/1969 | Bayer et al. | 260/94.9 C |
| 3,488,334 | 1/1970 | Bayer et al. | 260/94.9 C |
| 3,574,174 | 4/1971 | Bayer et al. | 260/94.9 B |
| 3,595,843 | 7/1971 | Huerta et al. | 260/94.9 B |

*Primary Examiner*—Alan Holler
*Attorney, Agent, or Firm*—Arthur S. Collins; Bryant W. Brennan; Fred S. Valles

[57] ABSTRACT

Vanadium organophosphates represented by the formula:

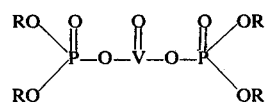

and polymers thereof represented by the formula:

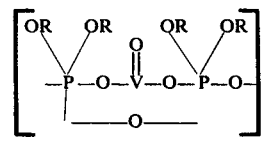

wherein x is 2 to 6, R is an alkyl or an alkyl ether having 1 to 6 carbon atoms or an aryl having up to 16 atoms, or mixtures thereof,
can be prepared by a reaction between a vanadium oxide, oxyhalide, or halide or an alkyl vanadate and a trialkyl, trialkyl ether or a triaryl phosphate. A mixture of the vanadium organophosphate and an organoaluminum halide forms an active vanadium coordination catalyst. This catalyst is especially useful in the production of "EP" and "EPDM" rubber. A particularly effective vanadium coordination catalyst comprises vanadium (IV) oxybis (diethyl phosphate) and an organoaluminum chloride.

18 Claims, No Drawings

VANADIUM ORGANOPHOSPHATES

CROSS REFERENCE TO RELATED APPLICATION

This application is a continuation-in-part of application, Ser. No. 102,949, filed Dec. 30, 1970, now abandoned, which was a division of application Ser. No. 836,169 filed June 24, 1969, now U.S. Pat. No. 3,595,890.

BACKGROUND OF THE INVENTION

1. Field of the Invention

This invention is directed to novel compositions of matter and processes for their synthesis, a novel catalyst which includes these compositions and a process using the catalysts. More particularly, the invention relates to vanadium organophosphates which when combined with organoaluminum halide compounds result in very active catalysts for the preparation of polymers of alpha-olefins and copolymers of alpha-olefins, and terpolymers of the alpha-olefins and a nonconjugated diene.

2. Description of the Prior Art

Transition metal compounds of various types have been disclosed in the prior art; see U.S. Pat. Nos. 3,113,115 and 3,297,733 and 3,361,779. Of the organometallic compounds disclosed, particular attention has been given to those in which the transition metal constituent is vanadium; see U.S. Pat. Nos. 3,294,828 and 3,361,778. Coordination catalysts containing a vanadium organometallic compound, e.g., vanadium tetrachlorides and vanadium oxytrichlorides, and a compound capable of reducing the vanadium to a valance state of less than 3, such as the organoaluminum compounds, have long been of interest for use as polymerization catalysts; see U.S. Pat. No. 2,962,451. This interest in developing novel vanadium-containing coordination catalysts is evidenced by the considerable number of recent patents on the subject; see, for example, U.S. Pat. Nos. 3,392,160 and 3,396,155 and 3,427,257. Particular attention has been shown in the preparation of alpha-olefin polymers, copolymers of alpha-olefins, e.g., ethylene/propylene (EP) rubber, and the terpolymers of the alpha-olefins with the non-conjugated dienes, e.g., ethylene/propylene/diene terpolymers, (EPDM rubber). Vanadium coordination catalysts have been disclosed as having activity for the preparation of EP and EPDM rubber; see U.S. Pat. Nos. 3,166,517 and 3,234,383.

SUMMARY OF THE INVENTION

The present invention provides a vanadium organophosphate composition represented by the formula:

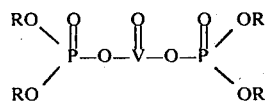

and polymers thereof, wherein R is an alkyl or an alkyl ether having 1 to 16 carbon atoms or an aryl having up to 16 carbon atoms or mixtures thereof. The polymers of this composition can be represented by the formula:

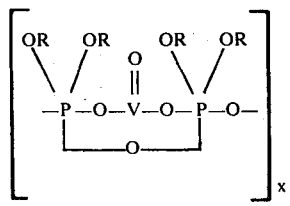

wherein x is 2 to 6.

This composition can be prepared by various routes as set forth below:

a. One route to this compound is to react one mole of a vanadium oxide, $V_2O_n$ wherein n is 3 to 5, e.g., $V_2O_5$, with at least four moles of trialkyl, trialkyl ether or triaryl phosphate to yield the vanadium organophosphate of this invention and side-products of an alcohol, an ether and an aldehyde as represented by the following equation:

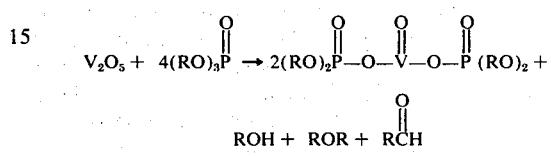

If 3/2 moles of oxygen are added to the above reaction, the same reaction occurs except the side-products are water and an aldehyde as in the following equation:

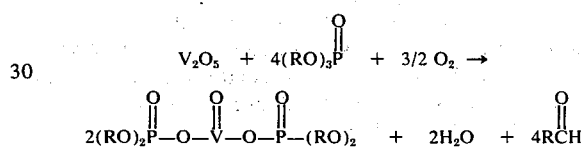

b. A second major route comprises reacting two moles of vanadium halide or vanadium oxyhalide with at least four moles of the phosphate used in route (a) to yield the vanadium organophosphate of this invention and side-products of halogen gas and alkyl halide, alkyl ether halide or aryl halide. One example of this route is represented by the following equation:

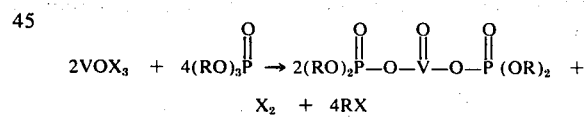

wherein X is chloro, bromo or iodo.

c. A third route for the composition of this invention comprises the reaction of two moles of an alkyl vanadate with at least four moles of the phosphate used in route (a) to yield the vanadium organophosphate plus the same side reactants as in the route (a) as indicated by the following equation:

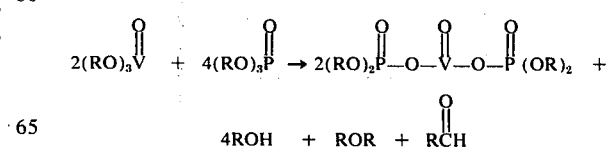

The vanadium organophosphate compounds of this invention when combined with organoaluminum halide compounds in the manner described below to form vanadium coordination catalysts are especially useful in the preparation of polymers of ethylene, propylene and similar alpha-olefins having the formula: R—CH=CH$_2$ wherein R is hydrogen or a hydrocarbon radical, particularly an unsaturated alkyl hydrocarbon radical having 1 to 8 carbon atoms, e.g., butene-1; hexene-1; 4-methylpentene-1; heptene-1; 5-methylhexene-1; octene-1; 4-ethylhexene-1; 1-nonene; 1-decene, and dienes, e.g., butadiene and the like. The catalyst of this invention is especially useful in the copolymerization of ethylene and propylene to yield rubbery products and the production of unsaturated, sulfur-vulcanizable, rubbery terpolymers of ethylene and propylene and a nonconjugated diene, e.g., dicyclopentadiene (DCP); methylcyclopentadiene; methylene norbornene (MNB); 1,5-cyclooctadiene; 1,4-hexadiene; 1,5-cyclooctadiene, or other copolymerizable dienes. The unique features of the vanadium coordination catalysts of this invention are high productivity of the catalyst in terms of the amount of product per pound of catalyst, low cost, ease of handling and storage, and good solubility and stability in solution.

PREFERRED EMBODIMENTS OF THIS INVENTION

In the preferred vanadium organophosphate compositions of this invention, R is a lower alkyl and x is 2 and/or 3 in the formulas set forth above in SUMMARY OF THE INVENTION. An especially preferred composition is designated as the dimer of vanadium (IV) oxybis (diethyl phosphate):

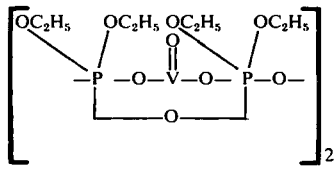

Other examples of vanadium organophosphate compositions of this invention include the following:

The dimer of vanadium (IV) oxybis (dimethyl phosphate):

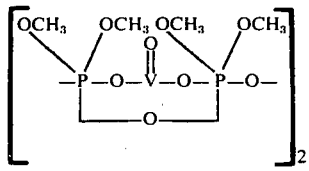

The dimer of vanadium (IV) oxybis (di-n-butyl phosphate):

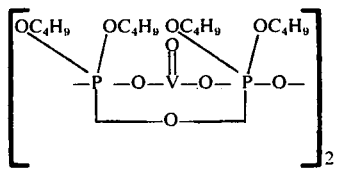

The dimer of vanadium (IV) oxy (diethyl phosphate) (di-n-butyl phosphate):

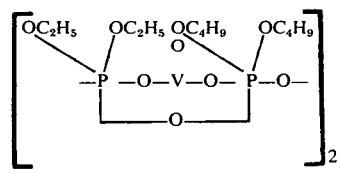

The preferred processes for the synthesis of the vanadium organophosphate composition of this invention include:

a. The reaction of a vanadium oxide having the general formula V$_2$O$_n$ wherein n is 3 to 5 with an organophosphate having the general formula:

(RO)$_3$P=O wherein R is an alkyl or an alkyl ether having 1 to 16 carbon atoms or an aryl having up to 16 carbon atoms at a temperature in the range of about 50° to 200°C., at subatmospheric to about atmospheric pressure or above for a period of ½ hour to several days. At temperatures below 50°C., little if any reaction takes place and above 200°C. the products have a tendency to decompose. Although this reaction can take place under a nitrogen blanket, the reaction rate and conversion increases with the addition of oxygen. The molar ratio of the organophosphate to the vanadium oxide in the reactants is about 4:1, although the reaction can be carried out in molar range of about 1:1 to 6:1. An excess amount of the organophosphate is generally added to keep the product in solution.

To obtain the preferred composition, 1 mole of vanadium pentoxide is reacted with at least 4 moles of triethyl phosphate at a temperature in the range of 150° to 200°C at atmospheric pressure for about 5 to 20 hours with at least 3/2 moles of oxygen. In addition to preparing the composition of vanadium (IV) oxybis (diethyl phosphate), at least 4 moles of acetaldehyde and 2 moles of water are produced. Further details of these syntheses are set forth in Examples 1 and 2 below.

b. The reaction of vanadium halides or oxyhalides such as VCl$_4$ and VOCl$_3$ with the organophosphate, as defined under (a) above, at room temperature to 250°C., and subatmospheric pressure for a period of ½ hour to several days.

c. The reaction of alkyl vanadates having the general formula:

wherein R is an alkyl having 1 to 16 carbon atoms with the organophosphate, as defined under (a) above, at room temperature to 200°C., and subatmospheric to atmospheric pressure for a period of ½ hour to several days.

The reaction mixture from one of the above routes is cooled, the excess solid reactants are removed, for example, by filtration, and the filtrate is stripped, preferably under a a vacuum to avoid decomposition of the product. The resultant impure liquid product can then be solubilized in a suitable solvent, filtered, vacuum stripped to remove the solvent and then crystallized to yield a crystalline product. The crystallization takes place by cooling the stripped product or by other known techniques. Suitable solvents for the vanadium organophosphate of this invention include low boiling paraffinic hydrocarbons such as pentane, hexane, heptane and the like, or aromatics such as benzene, toluene and the like.

The vanadium coordination catalysts of this invention are obtained by using the vanadium organophosphate composition described above with at least one organoaluminum halide reducing compound in the presence of an inert liquid organic medium. Representative types of organoaluminum compounds include dialkylaluminum monohalides; alkylaluminum dihalides; and aluminum alkyl, cycloalkyl or aryl sesquihalides. Particularly preferred organoaluminum halide compounds in combination with the vanadium organophosphates of this invention include diethylaluminum monochloride and ethylaluminum sesquichloride. Other organoaluminum compounds suitable for the coordination catalysts of this invention include methyl, propyl and isobutyl aluminum chlorides. Although the relative proportions of the vanadium organophosphates and the organoaluminum halide compounds can vary widely and one of ordinary skill in the art can readily determine the optimum proportions for specific vanadium and aluminum compounds by routine experimentation, one would generally operate with an Al:V molar ratio in the range of about 1:1 to 20:1. The Al:V molar ratio for the preferred vanadium and aluminum compounds, i.e., vanadium (IV) oxybis (diethyl phosphate) and ethylaluminum sesquichloride or diethylaluminum monochloride, is in the range of about 4:1 to 10:1.

Inert liquid organic media, i.e., liquids which do not interfere with the desired polymerization reaction, which are suitably present in the polymerization reaction with the vanadium coordination catalysts of this invention include tetrachloroethylene; aromatic solvents such as benzene, toluene, and xylenes; saturated aliphatic hydrocarbon and cycloaliphatic hydrocarbons such as cyclohexane, butane, neopentane, isopentane, n-pentane, cyclopentane, hexane, heptane, methylcyclohexane, 2,2,4-trimethylpentane, octane, and nonane; chlorinated aliphatic hydrocarbons; chlorinated cycloaliphatic hydrocarbons such as carbon tetrachloride, ethyl chloride, methyl chloride, 1,2-dichloroethane and trichloromonofluoromethane; and the organophosphates as described above. Particularly effective solvents for the preferred vanadium coordination catalyst of this invention are saturated aliphatic and cycloaliphatic hydrocarbons especially n-hexane, n-heptane, cyclohexane and cycloheptane.

The vanadium coordination catalysts of this invention are employed by contacting them with one or more of the monomers described in SUMMARY OF THE INVENTION at subatmospheric to above atmospheric pressure and at a temperature of about -50°C to 100°C. Preferably the conditions for polymerizing these monomers comprise from about atmospheric pressure to about 15 atmospheres and a temperature of about −5° to 50°C. It has been found for the vanadium coordination catalysts of this invention that at temperatures above 25°C the product yields tend to decrease at pressures in the range of about 25 to 125 psig.

The polymerization reaction is arrested and the product is precipitated out of solution by the addition of an alcohol. The product is then washed, filtered and dried. An antioxidant, such as butylated hydroxytoluene, is often added to the product prior to the recovery step to avoid its oxidation and degradation.

The polymerization reaction can either be carried out in a batch or continuous operation. In the continuous process, the solvent, vanadium coordination catalyst and monomers are continuously introduced into a reaction zone which is equipped with means for agitation at a sufficient rate to provide the residence time required for the desired polymer concentration in the reaction zone effluent.

The vanadium coordination catalysts of this invention are especially useful in the preparation of EP and EPDM rubbers. The ethylene content of these rubbery products ranges from between about 20 and 70 weight percent and correspondingly, the propylene content ranges from between 30 and 80 weight percent. In the case of EPDM, the amount of diene should exceed 1 weight percent of the final product and preferably ranges between about 3 and 30 weight percent. Accordingly, the ethylene and propylene in the final terpolymer ranges between about 70 and 97 weight percent.

The foregoing EP and EPDM rubbers are prepared by reacting, preferably in the presence of hydrogen or other known chain transfer agents, a monomeric mixture of ethylene and propylene comprising from about 20 to 70 weight percent ethylene and 30 to 80 weight percent propylene and, in the case of EPDM, the non-conjugated diene in a reaction zone in the presence of an inert solvent at a temperature of −5° to 50°C. with a catalytic amount of the vanadium coordination catalyst of this invention.

The examples below illustrate the methods of preparation of the compositions of the present invention and their use in polymerization.

EXAMPLE 1

PREPARATION OF VANADIUM (IV) OXYBIS (DIETHYL PHOSPHATE) FROM VANADIUM PENTOXIDE

Vanadium (IV) oxybis (diethyl phosphate) was prepared by charging 91.0 grams of (0.5 mole) of triethyl phosphate to a glass-bowl reactor equipped with a heating mantle, stirrer, and water condenser and then adding 18.2 grams (0.1 mole) of finely powdered vanadium pentoxide. The reactants were heated at reflux temperatures, i.e., about 180°C. at atmospheric pressure for 7 hours. Gas chromatographic analysis of the condensation of the effluent gases revealed that ethyl ether, acetylaldehyde and ethyl alcohol were produced as side products during the synthesis reaction. After the resulting product mixture was cooled to room temperature and the excess vanadium pentoxide filtered off, the filtrate, which was dark green in color, was analyzed and found to contain 5.2 weight percent vanadium. This represented a conversion of 35 percent of the vanadium in the reaction mixture to the desired product.

About 30 grams of the excess triethyl phosphate was stripped under 10 mm Hg vacuum from the product mixture. 250 ml of n-heptane were added to the green syrup residue and the residual triethyl phosphate was stripped at atmospheric pressure with the heptane solvent. Another addition of 250 ml of heptane and solvent stripping at atmospheric pressure completed the removal of the excess triethyl phosphate. Upon setting two days in an evaporating dish open to the air, a green solid crystallized from the syrup. The green solid was then solubilized in n-heptane and filtered removing a tar-like substance. The filtrate was vacuum stripped to remove the heptane. The resulting blue oil was allowed to crystallize in air to yield 15 grams of light blue crystals. Photomicrographs were taken of these crystals which indicated they were monoclinic in structure.

A sample of the blue crystals recrystallized four times from n-pentane was found to have the elemental analysis set forth in Table I below:

TABLE I

ELEMENTAL ANALYSIS OF VANADIUM (IV) OXYBIS (DIETHYL PHOSPHATE)

| ELEMENT | ACTUAL, WT. % | THEORETICAL, WT. % |
|---------|---------------|--------------------|
| C | 27.20 ± 0.3 | 25.75 |
| O | 35.35 ± 3.0 | 38.59 |
| H | 5.82 ± 0.3 | 5.40 |
| V | 13.67 ± 0.3 | 13.65 |
| P | 16.90 + 0.3 | 16.61 |
|   | 98.94 | 100.00 |

An analysis of the alkoxy groups indicated the following:

| ALKOXY GROUP | ACTUAL, WT. % | THEORETICAL, WT. % |
|--------------|---------------|--------------------|
| OC$_2$H$_5$ | 50.65 ± 0.5 | 48.302 |

The carbon, hydrogen and alkoxy contents indicated by the analysis are believed to be higher than theoretical because of the possibility of solvent contamination.

Differential thermal analysis (DTA) of the above pentane recrystallized vanadium organophosphate compound has shown the following peaks:

| TEMP., °C. | TYPE OF REACTION |
|------------|------------------|
| 31 | Irreversible |
| 79 | Reversible |
| 160 | Irreversible |
| 264 | Total decomposition |

The lowest peak of the DTA indicate that solvent was retained in the crystals on recrystallization. It was found that this lowest peak could be eliminated by three recrystallizations from n-heptane followed by ethylene glycol extraction and drying under a vacuum of 10 mm. Hg and the 3 recrystallizations from chemically pure n-hexane.

The molecular weight was determined of the above crystals from material purified by the ethylene glycol extraction and recrystallizations described in the above paragraph followed by drying under a high vacuum at ambient temperature. A 1 gram of the light blue crystals of the vanadium compound and 1 gram of naphthalene, which had been recrystallized from alcohol, were each separately reduced to a fine powder using an agate mortar and pestle. 0.049 grams of the light blue powder were weighed into a glass vial to which were added 0.2337 grams of the powdered naphthalene. The mixture was packed into a capillary tube and melted to a light blue liquid and then cooled to an opaque solid. The resulting opaque solid in the tube and a sample of pure naphthalene powder in another capillary tube were placed in a Mettler FPI Melting Apparatus. Each sample was heated at a rate of 0.2°C/min. and the melting points were found to be 78.6°C and 80.4°C for the opaque solid and pure naphthalene, respectively. The molecular weight of the vanadium organophosphate compound was calculated from the known freezing point depression constant, $k_{\Delta_f}$, for naphthalene, i.e., 69.0°C/gm. mole/100 gms., by the following equation:

$$MW = (k_{\Delta_f})(100) \frac{V \text{ compound Wt.}}{(\text{Naphthalene Wt.}) \Delta T_{m.p.}} =$$

$$(69.0)(100) \frac{(0.049)}{(0.2337)(80.4 - 78.6)} = 807$$

From the theoretical molecular weight of the vanadium organophosphate compound of 373.15 in the formula for this compound is about 2. This tends to indicate that the proposed molecular structure of the vanadium compound exists as a dimer in the aromatic solvent naphthalene and can be represented by the following structure:

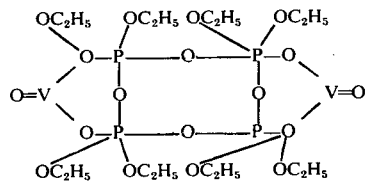

The molecular weight of the crystals were also determined using the method described above at other concentrations of the vanadium organophosphate in the solvent and using diphenyl as a solvent in place of naphthalene. The calculated value for x ranged from 1.9 to 2.2.

A comparison was made of the infrared spectrum of the vanadium (IV) oxybis (diethyl phosphate) material dispersed in petrolatum with the spectra of liquids of triethyl phosphate, triethyl vanadate and ethyl pyrophosphate and with the spectrum of phosphorus pentoxide also dispersed in petrolatum. The comparison lent further support for the proposed dimer structure. The vanadium compound absorbed very weakly in the 1265 cm.$^{-1}$ band assigned in the literature to the phosphoryl group indicating its absence which is in agreement with the proposed structure. Some absorption of the vanadium compound at 1220 cm.$^{-1}$ which was common to that of phosphorus pentoxide compound is an indication of some mode of vibration of the tetrahedral-oxygen group which occurs in both of the compounds.

Other infrared absorption bands which were common to the known compounds and the vanadium organophosphates are:
  970 cm.$^{-1}$
  1000 cm.$^{-1}$
  1030 cm.$^{-1}$
  1050 cm.$^{-1}$
  1100 cm.$^{-1}$
  1370 cm.$^{-1}$
  1400 cm.$^{-1}$ Nuclear magnetic resonance (NMR) measurements of the pure vanadium organophosphate compound were not feasible due to the paramagnetic nature of the vanadium atoms. However, hydrolysis and extraction of the vanadium by using hydrochloric acid enabled NMR examination of the hydrolyzed fragments in a deuterated chloroform solution. This examination indicated ethoxylated phosphorus which verified the presence of ethoxy groups on the phosphorus as in the proposed structure rather than on the vanadium.

About 1 gram of the pure compound of this example was soluble in 1 ml. each of methanol, acetone, ethylene glycol, propylene oxide, carbon tetrachloride, methylene chloride and benzene. About 1 gram of the compound was soluble in 10 ml. of n-hexane and was soluble in 5 ml. of water. The high solubility of the compound in nonpolar solvents is in agreement with the nonpolar nature of the proposed structure.

Other unique properties of the vanadium organophosphate compound in addition to its high solubility in nonpolar solvents is its stability both in its solid state and in aqueous solutions.

EXAMPLE 2

PREPARATION OF VANADIUM (IV) OXYBIS (DIETHYL PHOSPHATE) FROM VANADIUM PENTOXIDE WITH AN EXCESS OF OXYGEN

Vanadium (IV) oxybis (diethyl phosphate) was prepared by charging 18.2 grams (0.1 mole) of finely divided vanadium pentoxide and 182 grams (1 mole) of triethyl phosphate to a glass-bowl reactor equipped with a condenser, stirrer and a means for adding air. Air was bubbled into the reactants during the entire reaction. The reactants were heated at reflux temperatures of about 180°C. and atmospheric pressure for 4 hours. After the resulting product mixture was cooled to room temperature and 10 grams of the excess vanadium pentoxide was filtered off, representing 45 percent by weight conversion of the vanadium in the reaction mixture to the desired product, the filtrate was vacuum stripped at 10 mm Hg. and 130°C. The stripped liquid was cooled to room temperature, 200 ml. of benzene were added and the solution was heated to 50°C. for 1 hour. The resulting mixture was filtered, the filtrate was vacuum stripped at 10 mm Hg. and 120°C, and a thick blue syrup was formed. The syrup was cooled to room temperature and 150 ml. of n-hexane were added to the syrup to precipitate out the product, over a 2 hour period. 23.3 grams of light blue solid product were recovered after filtration and after the blue syrup was evaporated to 10 ml. Additional product was crystallized from the remaining 10 ml. of syrup on standing for 2 days. The product was found to be soluble in n-hexane and benzene and to be identical to the product produced by Example 1.

This Example indicates that the use of an excess of oxygen during the synthesis reaction resulting in an increase in the conversion and reaction rate.

EXAMPLE 3

USE OF VANADIUM (IV) OXYBIS (DIETHYL PHOSPHATE) OF EXAMPLE 1 IN THE PREPARATION OF EP RUBBER AT 25°C

A stirred glass-bowl reactor was charged with 30 psi of ethylene, 1300 cc of heptane and 320 cc of liquid propylene. During the course of the reaction, 0.31 grams of the vanadium (IV) oxybis (diethyl phosphate) obtained from Example 1 dissolved in 30 cc of benzene and 1.2 grams of ethylaluminum sesquichloride dissolved in 30 cc of n-heptane were continuously metered into the reactor. The reaction mixture was maintained at a temperature of 25°C. and a constant pressure of 60 psig with a gas mixture comprising 60 mole percent ethylene and 40 mole percent propylene. The reaction was terminated and the ethylene/propylene copolymer was precipitated out of solution by the addition of an excess amount of isopropyl alcohol after a total reaction time of 35 minutes. The resulting copolymer product was filtered, dried and weighed. The yield of the copolymer product was 106 grams. The EP rubber product was analyzed to contain 61 mole percent (45.4 weight percent) ethylene.

EXAMPLE 4

USE OF VANADIUM TETRACHLORIDE IN THE PREPARATION OF EP RUBBER AT 25°C AS A CONTROL

A control run was made at the identical operating conditions as described above, except that in place of the vanadium organophosphate catalyst component of this invention, vanadium tetrachloride ($VCl_4$) was employed in an amount of 0.16 grams dissolved in 30 cc. of benzene. The difference in the amount of the vanadium organophosphate employed versus that of the vanadium tetrachloride was the amount necessary to put the two catalysts on the basis of equivalent vanadium contents. The yield of the copolymer product for the control run was 118 grams.

EXAMPLE 5

USE OF VANADIUM (IV) OXYBIS (DIETHYL PHOSPHATE) OF EXAMPLE 1 IN THE PREPARATION OF EP RUBBER AT 40°C

Example 3 above was repeated except that the reaction temperature was increased to 40°C. The yield when operating with the catalyst of this invention was 37 grams.

EXAMPLE 6

USE OF VANADIUM (IV) OXYBIS (DIETHYL PHOSPHATE) OF EXAMPLE 1 IN THE PREPARATION OF EPDM RUBBER IN BATCH RUN

A stirred glass-bowl reactor was charged with 30 psi of ethylene, 3 psi of hydrogen, 1300 cc of n-heptane and 320 cc of propylene. The temperature of the reactants was raised to 25°C and 0.31 grams of the vanadium organophosphate compound prepared in the manner of Example 1 dissolved in 30 cc of benzene and 1.2 cc of ethylaluminum sesquichloride dissolved in 30 cc of n-heptane and 8.0 cc of ethylidenenorbornene (ENB) dissolved in 30 cc of n-heptane were added over a one half hour period. The reaction was continued for an additional 10 minutes after the catalyst and ENB and had been added to the reactor. The reaction product was coagulated by the addition of an excess amount of isopropyl alcohol containing 0.2 weight percent Ionol (butylated hydroxy toluene). The coagulated EPDM rubber was separated from the liquid and then reduced to a filterable crumb rubber by treatment in a Warring blender in the presence of isopropyl alcohol containing the Ionol. The resulting crumb rubber was separated from the alcohol by filtration to yield 74 grams of product. The EPDM rubber product was analyzed to contain 53.7 weight percent ethylene, 36.4 weight percent propylene and 9.9 weight percent ENB. This yield corresponds to a productivity of 239 grams of product per gram of the vanadium organophosphate catalyst of this invention or about 1560 grams of product per gram of vanadium content of the catalyst.

EXAMPLE 7

USE OF VANADIUM (IV) OXYBIS (DIETHYL PHOSPHATE) OF EXAMPLE 1 IN THE PREPARATION OF EPDM RUBBER IN A CONTINUOUS RUN

A feed vessel was charged with 2250 cc of n-heptane and 0.70 grams of ethylaluminum sesquichloride. A glass-bowl reactor was flushed with ethylene and charged with 30 psi of ethylene, 750 cc of the mixture from the feed vessel and 300 cc of liquid propylene. A continuous feed stream of ENB dissolved in 30 cc of n-heptane and the vanadium organophosphate compound prepared in the manner of Example 1 dissolved in 30 cc of benzene were continuously added during the course of this continuous run in the presence of hydrogen at a pressure of 100 psig and a temperature of 25°C. After a 30 minute initiation period, the liquid level in the reactor was maintained at 1300 cc by slowly discharging the contents.

The total reaction time for the continuous run was 90 minutes. The total feed added during this period and the resulting EPDM rubber properties are indicated in Table II below:

TABLE II

| Total Feed | | |
|---|---|---|
| Vanadium organophosphate compound | 0.137 | grams |
| Ethylaluminum sesquichloride | 0.70 | grams |
| Hydrogen | 9.0 | liters |
| Ethylene | 108. | liters |
| Propylene | 900. | cc |
| Ethylidene Norbornene | 18. | cc |
| n-heptane | 2250 | cc |
| EPDM Product Properties | | |
| Productivity | 580 | grams product/grams catalyst |
| Ethylene | 56.7 | wt. % |
| Propylene | 30.0 | wt. % |
| Ethylidene Norbornene | 13.3 | wt. % |
| Iodine Number | 28.1 | |
| Mooney viscosity | 150. | + ML (1+4) |
| Gels | 0.1 | wt. % | dark blue with an increase in viscosity. After cooling to room temperature, 50.3 grams of a blue solid containing 11.5 weight percent vanadium (5.8 weight percent of the product was vanadium in the pentavalent state) and 1.3 weight percent chloride was recovered. The resulting blue solid was insoluble in n-heptane, but highly soluble in benzene and toluene. On recrystallization from toluene, the resulting green crystals resembled the monoclinic crystals of the vanadium organophosphate recovered via the route of Example 1. The comparison of crystals was made by a study of the photomicrographs of the crystals from the two synthesis procedures. The crystals were found to have the elemental analysis set forth in Table III below:

TABLE III

| ELEMENTAL ANALYSIS OF VANADIUM (IV) OXYBIS (DIETHYL PHOSPHATE) FROM VANADIUM OXYTRICHLORIDE | | |
|---|---|---|
| ELEMENT | ACTUAL WT. % | THEORETICAL WT. % |
| C | 30.39 | 25.75 |
| O | 31.24* | 38.59 |
| H | 6.44 | 5.40 |
| V | 15.34 | 13.65 |
| P | 16.39 | 16.61 |
| Cl⁻ | 0.20 | 0.00 |
| | 100.00 | 100.00 |

*Calculated by difference.

EXAMPLE 8

PREPARATION OF VANADIUM (IV) OXYBIS (DIETHYL PHOSPHATE) FROM VANADIUM OXYTRICHLORIDE

To 52.2 grams (0.28 moles) of triethyl phosphate in 100 ml. of chemically pure n-heptane were added 25 grams (0.144 moles) of vanadium oxytrichloride dissolved in 150 ml. of chemically pure n-heptane over a half hour period to a flask equipped with a heating mantle, stirrer and condenser. A heavy, dark brown phase was formed during the addition of the reactants. The reaction mixture was refluxed at a temperature of about 180°C and atmospheric pressure for 8 hours. The presence of chlorine gas in the effluent vapors lends support to the following equation:

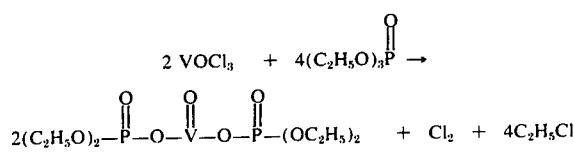

After cooling the resulting product mixture and separating it into two phases, the dark brown phase was heated for 30 minutes at 160°C. About 2 grams of a clear distillate were collected during the reaction. The dark brown mass during this heating step changed to

EXAMPLE 9

USE OF VANADIUM (IV) OXYBIS (DIETHYL PHOSPHATE) OF EXAMPLE 8 IN THE PREPARATION OF EP RUBBER

The same procedure was followed in this example that was followed in Example 3 except that 0.44 grams of the vanadium organophosphate compound of Example 6 was used. The yield of EP rubber product was 89 grams at 25°C and 55 grams at 40°C.

EXAMPLE 10

PREPARATION OF VANADIUM (IV) OXYBIS (DIETHYL PHOSPHATE) FROM TRIETHYL VANADATE

This method for preparing the vanadium organophosphate compound of this invention comprised adding 100 ml. of triethyl phosphate and 5 ml. of triethyl vanadate and reacting by heating the solution from 55°C. to a range of about 130°C to 180°C. at atmospheric pressure for a period of about 3 ½ hours. During this period the solution charged from an initial color of light orange to a final color of dark green similar to the color of the reaction product of Example 1. As in Example 1, the solid residue after removing the liquid product was light green in color. However, because of the unstability of the product produced by this method, none of the material extracted by benzene could be crystallized into the blue crystals characteristic of the vanadium organophosphate of this invention. The benzene solution of the compound had a vanadium content of 1 weight percent.

EXAMPLE 11

USE OF VANADIUM COMPOUND OF EXAMPLE 10 IN THE PREPARATION OF EP RUBBER

The procedure of Example 3 was carried out in this example except that 5.5 grams of the benzene solution containing the vanadium compound prepared via Example 10 were used. Only trace amounts of EP rubber product were produced at 25°C.

EXAMPLE 12

PREPARATION OF VANADIUM (IV) OXYBIS (DIMETHYL PHOSPHATE)

Into a reactor equipped as in Example 1, 280.0 grams (1.82 moles) of trimethyl phosphate and 18.2 grams (0.1 mole) of vanadium pentoxide were reacted for 15 hours at a temperature in the range of 145° to 195°C under atmospheric pressure. The resulting dark green phosphate was filtered leaving 10.7 grams of unreacted vanadium pentoxide. The liquid phase was stripped at 90°C and 10 mm. Hg vacuum, resulting in 55.6 grams of blue crystalline solid. The solid was insoluble in n-heptane, but soluble in benzene. Blue-green prismatic crystals were formed on a single recrystallization from the benzene solution and were found to have the elemental analysis set forth in Talbe IV below:

TABLE IV

ELEMENTAL ANALYSIS OF
VANADIUM (IV) OXYBIS (DIMETHYL PHOSPHATE)

| ELEMENT | ACTUAL WT. % | THEORETICAL WT. % |
|---------|--------------|-------------------|
| C       | 16.69        | 15.14             |
| O       | 42.59*       | 45.43             |
| H       | 4.19         | 3.83              |
| V       | 16.91        | 16.06             |
| P       | 19.62        | 19.54             |
|         | 100.00       | 100.00            |

*Calculated by difference.

An infrared analysis was made on the crystals from this Example. The spectrum illustrated some absorption of the vanadium compound at 1220 cm.$^{-1}$ which appears to be characteristic of the vanacium organophosphate compositions of this invention.

EXAMPLE 13

USE OF VANADIUM COMPOUND OF EXAMPLE 12 IN THE PREPARATION OF EP RUBBER

The procedure of Example 3 was again followed here except 0.45 grams of the vanadium (IV) oxybis (dimethyl phosphate) of Example 12 dissolved in 30 cc. of benzene were used. The yield of EP rubber product was 90 grams at 25°C. and 31 grams at 40°C.

EXAMPLE 14

USE OF THE VANADIUM COMPOUND OF EXAMPLE 1 IN THE PREPARATION OF POLYETHYLENE

A stirred glass-bowl reactor was charged with 210 grams of n-heptane, 0.48 grams of diethylaluminum chloride dissolved in 30 cc. of n-heptane and 0.13 grams of the vanadium (IV) oxybis (diethyl phosphate) of Example 1 dissolved in 30 cc. of benzene. Ethylene was introduced into the reactor and the reactor was maintained at a temperature of 57°C. and a constant ethylene gas pressure of 20 psig. At the end of 2 hours 28.0 grams of polyethylene were obtained. This yield corresponds to a productivity of 215 grams of polymer product per gram of the vanadium organophosphate catalyst of this invention.

EXAMPLE 15

PREPARATION OF VANADIUM (IV) OXYBIS (DI-META-TOLYL PHOSPHATE)

In the reactor equipped as in Example 1, 100 grams (0.271 moles) of tri-meta-tolyl phosphate $[(CH_3C_6H_4O)_3 PO]$ and 2.0 grams (0.011 moles) of vanadium pentoxide were heated from 25°C to 360°C in 1 hour and reacted at a temperature of 345° to 360°C and atmospheric pressure for 3 hours. The reaction product was cooled to 50°C. A brown syrupy product was recovered which was soluble in benzene but insoluble in n-hexane.

EXAMPLE 16

PREPARATION OF VANADIUM (IV) OXYBIS (DIBUTYL PHOSPHATE)

Into the reactor equipped as in Example 1, 100 grams (0.4 mole) of tributyl phosphate and 10 grams (0.055 mole) of vanadium pentoxide were reacted for 5 hours at a temperature in the range of 175° to 185°C and atmospheric pressure.

After a 3 hour period at 145° to 150°C and 10 mm Hg vacuum, the reaction was heated at 175°C and atmospheric pressure for an additional 1 hour period. For 5 minutes of this period, the temperature was increased to 250°C causing the reaction mixture to become black and foamy indicating that some decomposition of product had taken place. The reaction product was filtered to remove 8 grams of black residue leaving a green filtrate. The filtrate was vacuum stripped under a 10 mm Hg vacuum and 155°C to yield a green syrup which was completely soluble in n-hexane, petroleum ether, and methylene chloride. A green crystalline solid was recovered by evaporating the syrup in air to dryness and adding 6 drops of n-hexane per 5 grams of solid product. The resulting paste was filtered under vacuum for 1 hour until the product was substantially dry. The green solid product was found to contain 9.5 weight percent vanadium (10.5 percent theoretical) and 11.9 weight percent phosphorus (12.8 percent theoretical).

An infrared spectrum indicated the same characterised adsorption peak at 1220 cm.$^{-1}$ prevalent in the other species of the organophosphate compositions of this invention.

The foregoing examples have illustrated various methods for the synthesis of the novel compositions of this invention as well as their utility for use in polymerization catalysts.

While the theory behind the heretofore described processes is not fully understood, the following discussion of processes of the invention is included in the interest of adding to the understanding of the invention.

X-ray investigations have revealed two crystal forms for the vanadium organophosphates prepared in accordance with the foregoing examples. The first is a triclinic cell of three dimers and the second is a monoclinic cell of six dimers. The triclinic cell appears to be formed by a triad of dimers bonded on the edges of the tetrahedral dimers while the monoclinic cell appears to contain two triad chains of face-coupled tetrahedral dimers.

The procedure of Example 2, in which an excess of oxygen is employed during the synthesis operation, produces monoclinic crystals which are soluble in both benzene and n-heptane; and the procedure of Example 1, in which no excess of oxygen is employed during the synthesis operation, but in which crystallization is brought about by evaporating from a dish open to the air, over a two day period also produces monoclinic crystals which are highly soluble in benzene and other nonpolar solvents.

The procedure of Example 8, in which no excess of oxygen is employed during the synthesis operation, produces a product which is insoluble in n-heptane but highly soluble in benzene and toluene as is characteristic of triclinic crystal. Recrystallization of this product from toluene, results in the formation of monoclinic crystals. Similarly, triclinic crystals can be produced by the procedure of Example 1, if the crystallization takes place in the absence of air, and/or is rapid.

The procedures of Examples 12 and 15, in which no excess of oxygen is employed, are also noted to produce products which are insoluble in n-hexane, as is characteristic of the triclinic crystal structure.

What is claimed is:

1. A catalyst composition comprising a vanadium organophosphate compound having the formula:

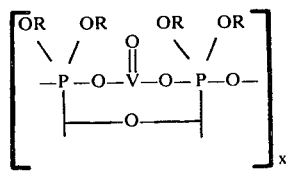

wherein R is methyl, ethyl, propyl, butyl or mixtures thereof and x is 2 to 6 and an organoaluminum halide wherein the molar ratio of Al/V in said catalyst composition is in the range of 1:1 to 20:1.

2. The catalyst composition of claim 1 wherein x is 2.

3. The catalyst composition of claim 1 wherein said organoaluminum halide is a dialkylaluminum monohalide.

4. The catalyst composition of claim 3 wherein said dialkylaluminum monohalide is diethylaluminum monochloride.

5. The catalyst composition of claim 1 wherein said organoaluminum halide is ethylaluminum sesquichloride.

6. A process for preparing polymers of at least one alpha-olefin which comprises reacting said alpha-olefin in the presence of an inert solvent at a temperature of about −50° to 100°C containing a catalytic amount of the catalyst composition of claim 1.

7. The process of claim 6 wherein said alpha-olefin is ethylene, propylene or mixtures thereof.

8. A process for preparing a polymer which comprises reacting a mixture comprising about 70 to 99 percent by weight of at least one alpha-olefin and about 1 to 30 percent by weight of at least one nonconjugated diene in the reaction zone in the presence of an inert solvent at a temperature of about −5° to 50°C containing a catalytic amount of the catalyst composition of claim 1.

9. A process for preparing a terpolymer of ethylene/propylene/diene monomers which comprises reacting a monomeric mixture comprising from about 20 to about 70 parts by weight of ethylene, from about 30 to about 80 parts by weight of propylene and from about 1 to about 30 parts by weight of a nonconjugated diene in a reaction zone in the presence of an inert solvent at a temperature of about −5° to 50°C containing a catalytic amount of the catalyst of claim 1.

10. A catalyst composition comprising a vanadium organophosphate compound represented by the formulas:

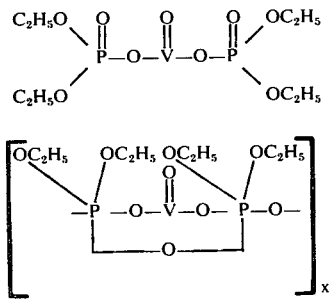

wherein x is 2 to 6, or mixtures thereof and an organoaluminum chloride wherein the Al:V molar ratio is in the range of about 4:1 to 10:1.

11. The catalyst composition of claim 10 wherein the second formula predominates and x is 2.

12. The catalyst composition of claim 10 wherein said organoaluminum chloride is ethylaluminum sesquichloride.

13. A process for preparing an ethylene/propylene copolymer which comprises reacting a monomeric mixture comprising from about 20 to 70 weight percent ethylene and from 30 to about 80 weight percent propylene in a reaction zone in the presence of an inert solvent at a temperature of about −5° to 50°C containing a catalytic amount of the catalyst composition of claim 10.

14. A process for preparing a terpolymer of ethylene/propylene/diene monomers which comprises reacting a monomeric mixture comprising from about 20 to about 70 parts by weight of ethylene, from about 30 to about 80 parts by weight of propylene and from about 1 to about 30 parts by weight of a nonconjugated diene in a reaction zone in the presence of an inert solvent at a temperature of about −5° to 50°C containing a catalytic amount of the catalyst composition of claim 11.

15. The catalyst composition of claim 2 wherein said organophosphate compound has been crystallized from a hydrocarbon solvent before being combined with said organoaluminum compound.

16. The catalyst composition of claim 11 wherein said organophosphate compound has been crystallized out in a monoclinic form before being combined with said organoaluminum compound.

17. The catalyst composition of claim 15 wherein said organophosphate compound has been further purified by filtration and recrystallization from a hydrocarbon solvent before being combined with said organoaluminum compound.

18. The catalyst composition of claim 16 wherein said organophosphate compound has been further purified by filtration and recrystallization from a hydrocarbon solvent before being combined with said organoaluminum compound.

* * * * *